(12) United States Patent
Hassan

(10) Patent No.: US 9,804,803 B2
(45) Date of Patent: Oct. 31, 2017

(54) DATA ACCESS IN HYBRID MAIN MEMORY SYSTEMS

(71) Applicant: SAP SE, Walldorf (DE)

(72) Inventor: Ahmad Hassan, Belfast (GB)

(73) Assignee: SAP SE, Walldorf (DE)

( * ) Notice: Subject to any disclaimer, the term of this patent is extended or adjusted under 35 U.S.C. 154(b) by 249 days.

(21) Appl. No.: 14/831,624

(22) Filed: Aug. 20, 2015

(65) Prior Publication Data
US 2017/0052742 A1    Feb. 23, 2017

(51) Int. Cl.
*G06F 12/00* (2006.01)
*G06F 3/06* (2006.01)

(52) U.S. Cl.
CPC .......... *G06F 3/0685* (2013.01); *G06F 3/0611* (2013.01); *G06F 3/0631* (2013.01); *G06F 3/067* (2013.01)

(58) Field of Classification Search
None
See application file for complete search history.

(56) References Cited

U.S. PATENT DOCUMENTS

| | | | | |
|---|---|---|---|---|
| 7,774,556 B2* | 8/2010 | Karamcheti | .......... | G06F 9/5016 711/146 |
| 2011/0093654 A1* | 4/2011 | Roberts | ................ | G06F 1/3203 711/105 |

* cited by examiner

*Primary Examiner* — Brian Peugh
(74) *Attorney, Agent, or Firm* — Fish & Richardson P.C.

(57) ABSTRACT

Implementations of the present disclosure include methods, systems, and computer-readable storage mediums for identifying a data processing function to be executed in a hybrid main memory system, the hybrid main memory system including a first type of main memory and a second type of main memory, the data processing function including data access operations to access the hybrid main memory system, accessing a write metric for the data processing function, the write metric based at least in part on a proportion of the data access operations that are write operations, and, based at least in part on the write metric being less than a threshold value, designating the data processing function for execution in the first type of main memory.

20 Claims, 6 Drawing Sheets

DATA ACCESS IN HYBRID MAIN MEMORY SYSTEMS

BACKGROUND

A business or other type of enterprise may operate enterprise systems to provide software functionality to customers and employees. An enterprise system may include back-end enterprise servers that host enterprise applications such as enterprise resource planning (ERP) systems, client-relationship management (CRM) systems, product lifecycle management (PLM) systems, supply chain management (SCM) systems, supplier relationship management (SRM) systems, and so forth. During the execution of an enterprise application, application data may be placed in or accessed from the main memory of the enterprise server, such that the application data is immediately accessible by processors of the enterprise server.

Increasingly, large amounts of application data are stored in the main memory of enterprise servers. Main memory may include dynamic random access memory (DRAM), which consumes a relatively high amount of static energy both in active and idle states due to continuous leakage and refresh power. Various byte-addressable non-volatile memory (NVM) technologies promise near-zero static energy and persistence. However, NVM may exhibit high latency and high dynamic energy relative to DRAM.

SUMMARY

Implementations of the present disclosure include computer-implemented methods for scheduling the execution of data processing functions in a hybrid main memory system that includes multiple types of physical memory (e.g., dynamic random access memory (DRAM), non-volatile memory (NVM)). In some implementations, methods include actions of identifying a data processing function to be executed in a hybrid main memory system, the hybrid main memory system including a first type of main memory and a second type of main memory, the data processing function including data access operations to access the hybrid main memory system, accessing a write metric for the data processing function, the write metric based at least in part on a proportion of the data access operations that are write operations, and, based at least in part on the write metric being less than a threshold value, designating the data processing function for execution in the first type of main memory.

These and other implementations may each optionally include one or more of the following features: actions further include: based at least in part on the write metric being greater than the threshold value, designating the data processing function for execution in the second type of main memory; the first type of main memory includes non-volatile memory (NVM), and the second type of main memory includes dynamic random access memory (DRAM); the first type of main memory includes at least one memristor; the first type of main memory is characterized by a first write latency of executing one or more of the write operations; the second type of main memory is characterized by a second write latency of executing the one or more of the write operations; the first write latency is greater than the second write latency; actions further include: determining at least one input data object that is consumed by the data processing function, based on the at least one input data object being in the first type of main memory, and further based on the data processing function being designated for execution in the second type of main memory, migrating the at least one input data object from the first type of main memory to the second type of main memory, and, based on the at least one input data object being in the second type of main memory, and further based on the data processing function being designated for execution in the first type of main memory, migrating the at least one input data object from the second type of main memory to the first type of main memory; and actions further include: during a previous execution of the data processing function, collecting statistics indicating: a number of the data access operations performed by the data processing function, a number of the write operations performed by the data processing function, and determining the write metric based at least in part on the proportion the number of the write operations to the number of the data access operations.

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
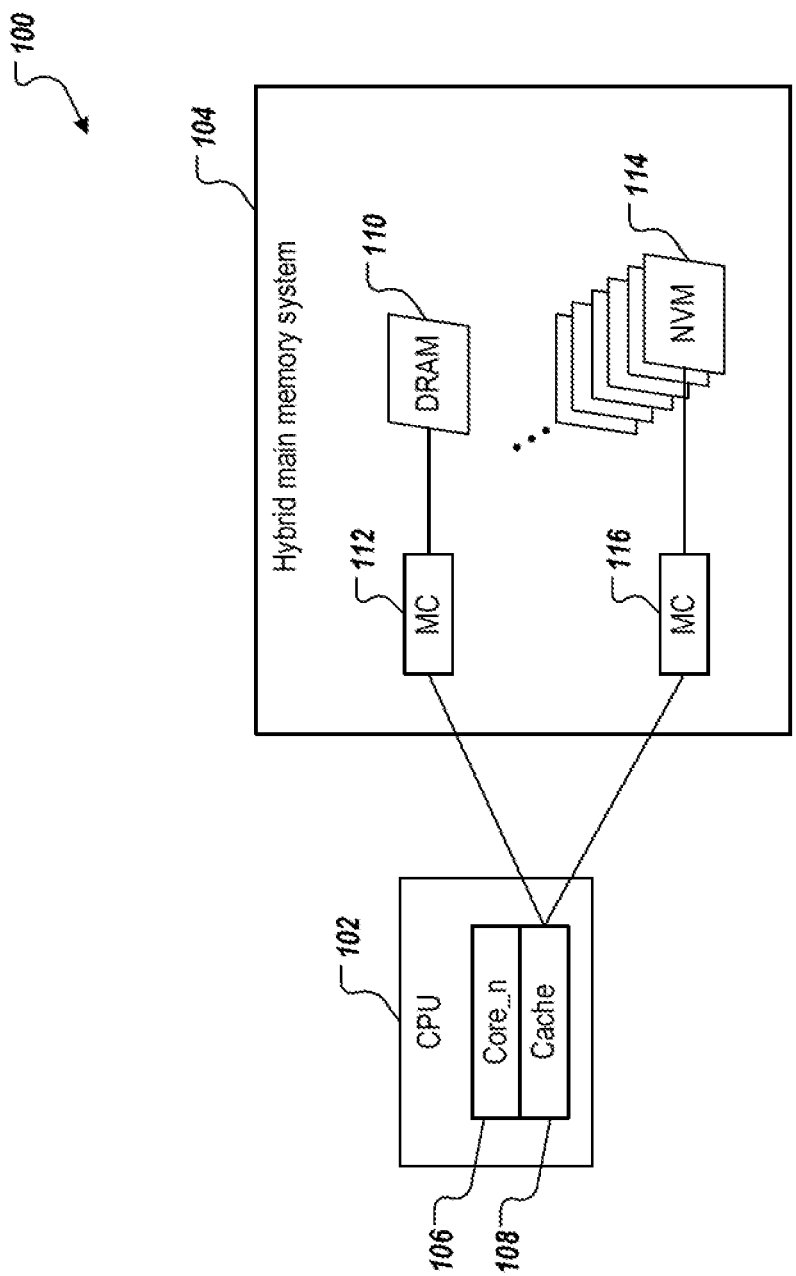
FIG. 1 depicts an example memory architecture in accordance with implementations such as those of the present disclosure.

Implementations of the present disclosure are directed to scheduling the execution of data processing functions in a hybrid main memory system that includes multiple types of physical memory (e.g., dynamic random access memory (DRAM), non-volatile memory (NVM)). A data processing function may include any number of data access operations, such as read operations and write operations. In some implementations, a write metric may be calculated for a data processing function. The write metric for a particular data processing function may indicate a proportion of the data access operations that are write operations included in that particular data processing function. In some examples, the write metric may be employed by a scheduler, optimizer, or other control module to determine a portion of the hybrid main memory system on which to execute the data processing function. In some examples, a data processing function may be scheduled for execution in NVM, if the write metric for the data processing function is below a predetermined threshold value. In some examples, the data processing function may be scheduled for execution in DRAM, if the write metric is at least the predetermined threshold value.

DRAM scaling may be used to store and manage application data in main memory of enterprise servers. Given the limits of DRAM scaling, in some cases byte-addressable NVM may be employed in main memory to at least partly replace or supplement the DRAM. However, NVM has certain disadvantages, which may vary among various NVM technologies. Disadvantages of NVM may include high latency and high dynamic energy for NVM accesses. NVM may also exhibit reduced memory bandwidth and a faster wear-out of NVM devices in comparison to DRAM. NVM also has advantages. For example, NVM may scale to smaller feature sizes and may exhibit a significantly decreased lower static energy due to the absence of refresh operations. In some cases, the static energy of NVM may be approximately 100 times lower than that of DRAM.

Implementations of the present disclosure employ a hybrid main memory system, including both DRAM and NVM, to exploit the advantages of NVM while mitigating its disadvantages. Incorporating NVM in a hybrid main memory system may allow the system to scale to higher storage capacities, given the scalability and high density nature of NVM. Unlike DRAM, NVM is characterized by low leakage power and no refresh power, due to the type of storage technology employed in NVM. Accordingly, a hybrid main memory system that includes NVM may operate at a lower static power compared to a pure DRAM system. However, NVM exhibits asymmetric read and write latencies, such as higher write latencies than read latencies. The read latency of NVM may be similar to that of DRAM, where the write latency of NVM may be considerably higher than that of DRAM. By calculating a write metric for one or more data processing functions of a QEP, implementations of the present disclosure may identify the more write-intensive data processing functions, such as those functions for which the proportion of write operations to total data access operations is higher than a predetermined threshold. The more write-intensive data processing functions may then be executed in DRAM instead of in NVM, given that NVM exhibits a higher latency of write operations compared to DRAM. In this way, implementations may lower the overall latency incurred during execution of a QEP in a hybrid main memory system.

Further, write operations may degrade NVM over time, wearing out the NVM until it is eventually unusable. Thus, by limiting the write operations performed in NVM and selectively performing write operations on DRAM instead of NVM, implementations of the present disclosure may increase the overall usable lifespan of the NVM in a hybrid main memory system. Table 1 below provides a comparison between the cell size, write endurance, and non-volatility characteristics of example DRAM and example NVM (e.g., memristors).

TABLE 1

|  | DRAM | NVM (e.g., memristor) |
| --- | --- | --- |
| Cell Size | 6-8 $F^2$ | 4-20 $F^2$ |
| Write Endurance | $10^{15}$ | $10^8$-$10^{12}$ |
| Non-volatility | No | Yes |

In Table 1, write endurance may indicate the number of write operations that may be performed in a particular type of main memory before the main memory degrades or otherwise becomes unusable.

Implementations of the present disclosure are applicable to hybrid main memory systems, including DRAM and NVM, to support the operations of one or more applications executing in an enterprise business environment or any other appropriate computing environment. For example, application(s) may employ an in-memory database that is on a hybrid main memory system. Use of such an in-memory database may enable application(s) to access the database with lower latency than may be exhibited when accessing a database stored in a disk storage device. Implementations of the present disclosure may analyze one or more data processing functions, which may be included in a QEP of an application. A data processing function, which may also be referred to as a function or an operator, may include any number of data access operations such as read operations and write operations. Implementations of the present disclosure may identify those data processing functions that are more write-intensive, and selectively schedule those data processing functions to be executed in DRAM instead of NVM. The data processing functions that are less write-intensive may be executed in NVM.

In some examples, it may be determined that a data processing function takes, as input, one or more input data objects. If the data input object(s) for a data processing function are currently in a different type of main memory than where the data processing function is to be executed, the data input object(s) may be migrated to the type of main memory where the data processing function is to be executed. For example, if the data input object(s) are in DRAM, but the data processing function is scheduled to be executed in NVM, the data input object(s) may be migrated (e.g., moved, copied) from DRAM to NVM. Similarly, if the data input object(s) are in NVM, but the data processing function is scheduled to be executed in DRAM, the data input object(s) may be migrated from NVM to DRAM. In some examples, an object may be described as a unit of memory (e.g., an indivisible unit) that may be allocated by an application. An object may comprise one or more variables of any type, or one or more arrays of variables of any type, or other arrangements of data. An object may include any amount of data that is arranged according to any format or unformatted.

FIG. 1 depicts an example memory architecture 100 that may be implemented within an enterprise server or other type of computing device(s). In the example of FIG. 1, the example memory architecture 100 includes a central processing unit (CPU) 102 and a hybrid main memory system 104. The CPU 102 includes a core 106 having a respective cache 108. Although a single core 106 and respective cache 108 is depicted, it is appreciated that the CPU 102 may include multiple cores 106, each with a respective cache 108. Further, although a single CPU 102 is depicted, it is appreciated that computing device(s) may include multiple CPUs 102. The main memory system 104 includes DRAM 110 with a respective memory controller (MC) 112, and NVM 114 with a respective MC 116. In some cases, a cache 108 accesses (e.g., reads, writes, deletes, etc.) data in the DRAM 110 through the MC 112, and accesses data in the NVM 114 through the MC 116. The hybrid main memory system 104 may include any number of instances, or cells, of DRAM and NVM, to provide any amount of memory for use by the CPU(s) 102.

In some examples, the example memory architecture 100 may support an in-memory database that uses main memory for data storage. Main memory may include one or more types of random access memory (RAM) that communicates with one or more processors, e.g., CPU(s), over a memory bus. An in-memory database system may be contrasted with database management systems that employ a disk storage mechanism. In some examples, in-memory database systems may be faster than disk storage databases, because internal optimization algorithms may be simpler and execute fewer CPU instructions. In some examples, accessing data in an in-memory database system may reduce or eliminate seek time when querying the data, providing faster and more predictable performance than disk-storage databases. An in-memory database may include a row-oriented database, in which data is stored in any number of rows or records. An in-memory database may also include a column-oriented in-memory database, in which data tables are stored as sections of columns of data (rather than as rows of data). An example in-memory database system is HANA™, provided by SAP™ SE of Walldorf, Germany.

Figure 2:
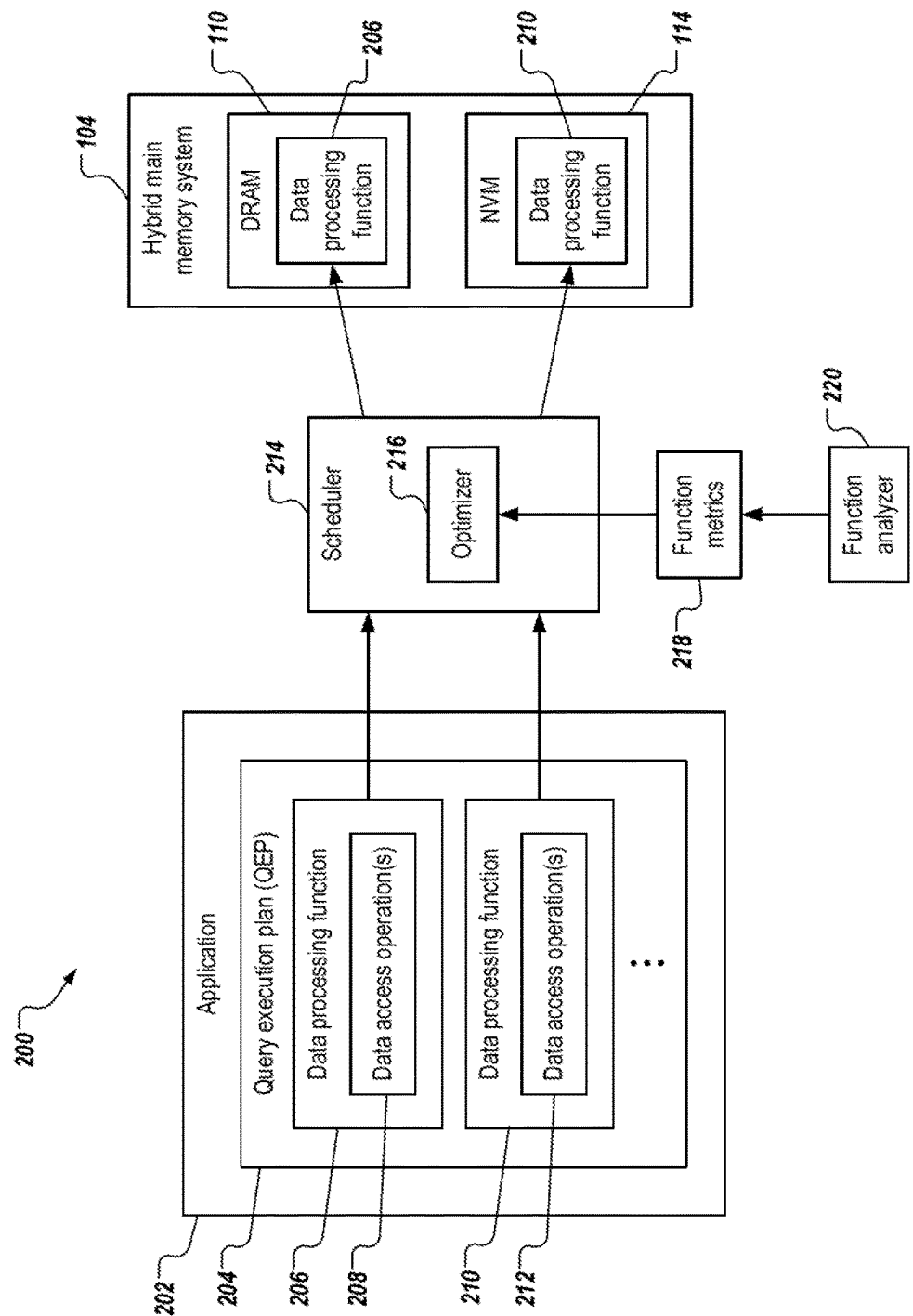
FIG. 2 depicts an example architecture for scheduling data processing functions of a query execution plan (QEP) in a hybrid main memory system in accordance with implementations such as those of the present disclosure.

FIG. 2 depicts an example architecture 200 for executing, or scheduling for execution, one or more data processing functions of a QEP included in an application. As shown in the example of FIG. 2, the example architecture 200 may include an application 202. The application 202 may execute on one or more processors, such as the CPU 102. The application 202 may include a QEP 204 that comprises any number of data processing functions. In the example of FIG. 2, the QEP 204 includes at least two data processing functions 206, 210. A data processing function may include any number of data access operations. Data access operations may include any type of operation to access data present in the hybrid main memory system 104. In some examples, data access operations include read operations to retrieve any amount of data. In some examples, data access operations include write operations to place any amount of new data into the hybrid main memory system 104 or to update any amount of existing data in the hybrid main memory system 104. In some examples, data access operations include delete or drop operations to remove any amount of data from the hybrid main memory system 104. In some examples, data access operations include other types of operations, including, but not limited to: join operations of any type; sorting or ordering operations; mathematical operations on the data; difference operations to identify differences (e.g., deltas) between sets of data; and so forth. In the example of FIG. 2, the data processing function 206 includes a first set of one or more data access operations 208, and the data processing function 210 includes a second set of one or more data access operations 212.

In some implementations, the application 202 may provide the QEP 204, or one or more data processing functions of the QEP 204, to a scheduler 214. The scheduler 214 may execute on one or more computing devices, and may execute on the same or different computing device(s) as the application 202. In some implementations, the scheduler 214 may include an executable library, interface, or other software module that is called from the application 202 to cause the execution of data processing function(s) of the QEP 204 in various portion(s) of the hybrid main memory system 104. The scheduler 214 may include an optimizer 216 that is configured to determine, for one or more data access operation(s), the portion of the hybrid main memory system 104 in which to execute, or schedule the execution of, each data access operation. For example, the optimizer 216 may determine that the data processing function 206 is to be executed in DRAM 110 and that the data processing function 210 is to be executed in NVM 114. In some examples, the scheduler 214 may schedule the data processing function(s) to be executed at some later time. In some examples, the scheduler 214 may (e.g., immediately or within a current time period) execute the data processing function(s), or cause their execution, in the determined portions of the hybrid main memory system 104. Although FIG. 2 depicts the optimizer 216 as a component or sub-module of the scheduler 214 that executes in a same execution path as the scheduler 214, in some implementations the optimizer 216 may execute as a separate software module with respect to the scheduler 214.

In some implementations, one or both of the optimizer 216 or the scheduler 214 may access function metrics 218 associated with one or more of the data access operations of one or more QEPs 204. In some examples, the function metrics 218 may include a write metric for each of one or more data processing functions. A write metric may describe, for a data processing function, a proportion of the data access operations that are write operations. Accordingly, a write metric may provide an indication of how write-intensive a particular data processing function is. In some examples, a write metric may be expressed as a percentage. For example, a write metric may indicate that 10% of the data access operations of a particular data access operation are write operations. In some implementations, the function metrics 218 may be generated by a function analyzer 220 analyzing one or more prior executions of a QEP 204 in an application 202. Determination of the write metric is described in further detail herein with reference to FIG. 4.

Based on the write metrics for one or more data processing functions, one or both of the optimizer 216 or the scheduler 214 may determine a portion of the hybrid main memory system 104 in which to execute each of the one or more data processing functions. In some implementations, the write metric for a data processing function may be compared to a predetermined threshold value, and the result of this comparison may be used to determine whether to execute the data processing function in DRAM 110 or NVM 114. For example, if the write metric for a data processing function is less than 5%, the data processing function may be executed in NVM 114. As another example, if the write metric is greater than or equal to 5%, the data processing function may be executed in DRAM 110. In this manner, the less write-intensive data processing functions may be executed in NVM 114, whereas the more write-intensive data processing functions may be executed in DRAM 110 to avoid the disadvantages of performing write operations in NVM such as higher latency and faster degradation of NVM resulting from write operations. Determination of where to execute data processing function(s) is described in further detail herein with reference to FIG. 5.

Figure 3:
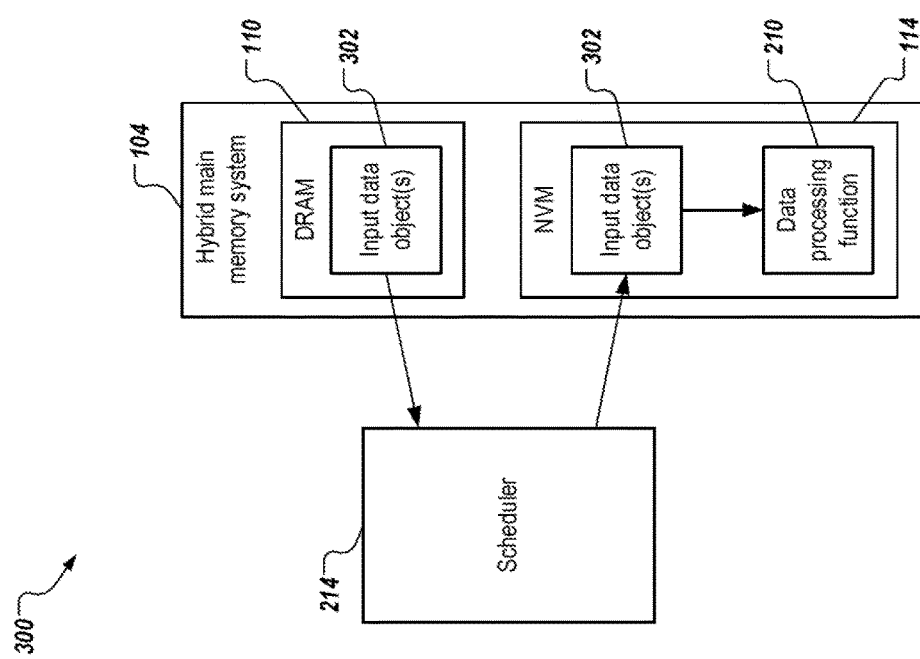
FIG. 3 depicts an example architecture for migrating input data object(s) between portions of a hybrid main memory system in accordance with implementations such as those of the present disclosure.

FIG. 3 depicts an example architecture 300, in which one or more objects may be migrated between portions of a hybrid main memory system 104. In some examples, a data processing function may use, as input, one or more input data objects 302. Such input data object(s) 302 may be generated by other data processing function(s), and the data processing function may depend on the input data object(s) 302 to perform its processing. In some examples, the input data object(s) 302 may be currently present (e.g., were created) in a different portion of the hybrid main memory system 104 than the portion in which the data processing function is scheduled to execute. In such examples, the input data object(s) 302 may be migrated to the portion where the data processing function is scheduled to execute, to enable the successful execution of the data processing function.

In the example of FIG. 3, the data processing function 210 is scheduled, or otherwise designated, to execute in NVM 114. However, the data processing function 210 consumes input data object(s) 302 that are currently present in DRAM 110. Accordingly, the scheduler 214 or some other process may migrate the input data object(s) 302 from DRAM 110 to NVM 114, to enable the execution of the data processing function 210 in NVM 114. Migration may comprise copying the input data object(s) 302 from DRAM 110 to NVM 114 (or from NVM 114 to DRAM 110), such that copies of the input data object(s) 302 are present in both DRAM 110 and NVM 114 after migration. Alternatively, migration may include moving the input data object(s) 302 from DRAM 110 to NVM 114 (or from NVM 114 to DRAM 110) such that a copy of the input data object(s) 302 is present in the destination portion and removed from the source portion.

In some implementations, input data object(s) may not be migrated and the input data object(s) may be remotely accessed by the data processing function executing in another portion of the hybrid main memory system 104. However, such remote accesses may increase the latency of executing a data processing function. Accordingly, the input data object(s) may be migrated between types of memory to avoid such added latency.

Figure 4:
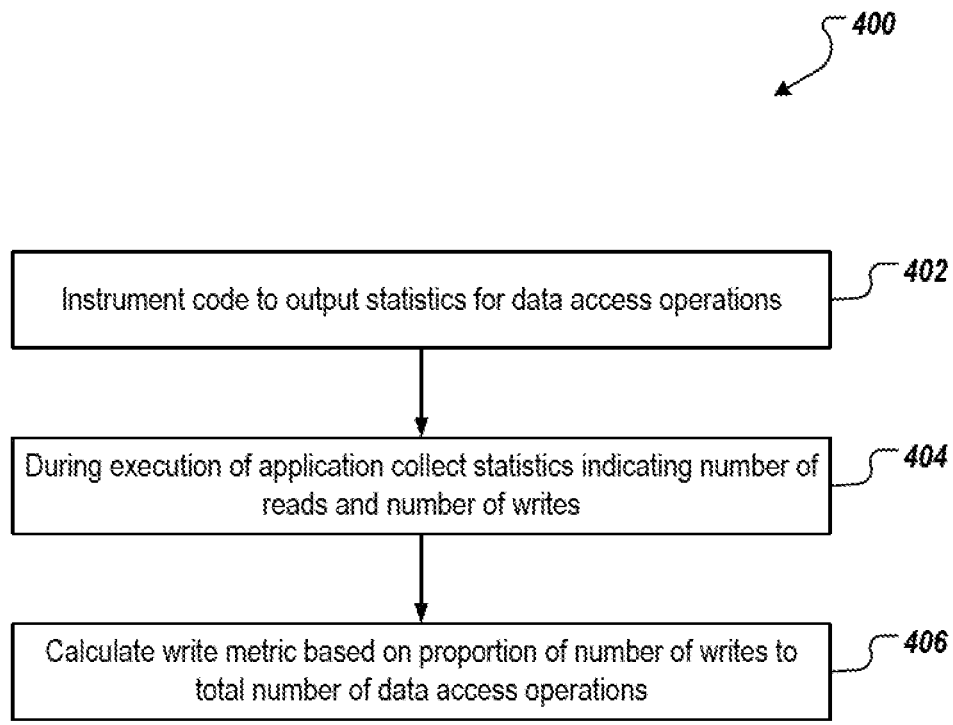
FIG. 4 depicts an example process that can be executed in accordance with implementations such as those of the present disclosure.

FIG. 4 depicts an example process 400 for determining a write metric to be employed in scheduling data processing functions for execution, in accordance with implementations such as those of the present disclosure. In some implementations, the example process 400 may be performed using one or more computer-executable programs executed using one or more computing devices. For example, operations of the example process 400 may be performed by the function analyzer 220.

At least a portion of the executable code, or intermediate language code, of an application 202 may be instrumented (402) such that statistics for data access operations may be output when the application 202 is executed. Such statistics may include, for example, an indication of the number of write operations or read operations performed during execution of a data processing function in a QEP 204 included in the application 202. During one or more executions of the application 202, the statistics may be generated by the instrumented code and collected for analysis (404).

In some implementations, code for the application 202 may be instrumented during compilation of source code or after compilation generates intermediate representation (IR) code or machine-executable code. In some implementations, the IR for an application 202 may be analyzed and instrumentation may be added to the IR. For example, the IR may be analyzed to mark the start and end of each data access operation or each data processing function in a QEP 204 of the application 202. Instrumentation may also identify global variables, stack-allocated variables, and heap allocations performed in the application 202. Instrumentation code may be added to the IR to call into a runtime library, to register functions and the allocation of objects within functions. Load and store instructions in the IR may be instrumented by inserting a call to the runtime library that registers the load or store operation at the corresponding address. To identify the corresponding object, the runtime library may then use a splay tree or other type of binary search tree that lists objects of the application 202.

In some implementations, one or more of the following example instructions may be inserted into the executable code of the application 202 during instrumentation: markStart, markEnd, profileMALLOC, profileFREE, profileREALLOC, profileMMAP, profileMUNMAP, profileSTORE, or profileLOAD. The markStart and markEnd instructions may emit information describing, respectively, the start or end of a data processing function or a data access operation. The profileMALLOC, profileFREE, profileREALLOC, profileMMAP, profileMUNMAP, profileSTORE, and profileLOAD instructions may emit information describing, respectively, executed malloc, free, realloc, mmap, munmap, store, and load operations. The profileMALLOC, profileMMAP, and profileREALLOC instructions may be invoked whenever an application 202 initializes an object using malloc, mmap, or realloc respectively. Each memory allocation may be tracked within an application 202 inside an in-memory splay tree structure. Each data object may represent a node in the splay tree, where a node may store information such as the starting virtual memory address and the data object size.

The profileSTORE and profileLOAD instructions may invoke the call back functions whenever an application 202 calls a real store or load operation respectively. In some implementations, before executing the real store or load, operation data may be provided to a cache simulator, whether the operation is an off-chip memory access. If an operation is an off-chip memory access, the appropriate node in the splay tree may be updated with an incremented access count. For each function in a QEP 204, the function analyzer 220 may profile one or more of the following: total loads, total stores, off-chip reads, last level cache (LLC) writebacks, lifetime, or total memory allocated within a particular function. When the application 202 finishes the execution of a workload, the profiled data in the splay tree may be written to a file. This data may be used for analytical modeling by one or both of the optimizer 216 or the scheduler 214 to determine a scheduling policy for the QEP 204. The scheduling policy may indicate where (e.g., NVM or DRAM) data processing function(s) are to be executed.

For each of one or more data processing functions in a QEP 204, a write metric may be calculated (406). In some implementations, the write metric may indicate a proportion of write operations in the total number of data access operations performed within the data processing function. Implementations of the present disclosure support other types of write metrics. The write metric for a data processing function may be calculated based on statistics regarding the various operations of the data processing function, as described above with reference to 402 and 404. In some implementations, for each data processing function $F_n$, a write metric may be calculated according to Example Formula 1 below.

Example Formula 1

$$E_n = \frac{\sum_1^N \text{off-chip writes}}{\mu_w} \times 100$$

The term off-chip accesses indicates accesses going to main memory. For a data processing function $F_n$, write metric $E_n$ may represent a proportion of off-chip writes in the data processing function to the total number of off-chip accesses by the whole QEP. In some implementations, as shown in the Example Formula 1, the write metric may be expressed as a percentage. Implementations of the present disclosure also support other formats or ranges of the write metric. An off-chip access may be an access to main memory, such as the hybrid main memory system 104. The value of $\mu_w$ may indicate a total number of write accesses to main memory. A write metric may also be described as an endurance weight, given that it describes an endurance cost incurred by running the number of write operations on NVM. For example, a higher endurance weight may indicate that the NVM degrades more through execution of the data processing function than through another function with a lower endurance weight, given the higher number of writes performed on the NVM.

Implementations of the present disclosure may calculate the write metric, and determine a portion of main memory (e.g., NVM or DRAM) in which to execute a data processing function, based on a measured number of write operations included in the data processing function. In some examples, the impact of read accesses is not considered, given that reading from NVM may not degrade the NVM in the same way as write accesses, and given that the latency of reads is similar between DRAM and NVM. Implementations of the present disclosure may attempt, overall, to reduce the write traffic to NVM.

Figure 5:
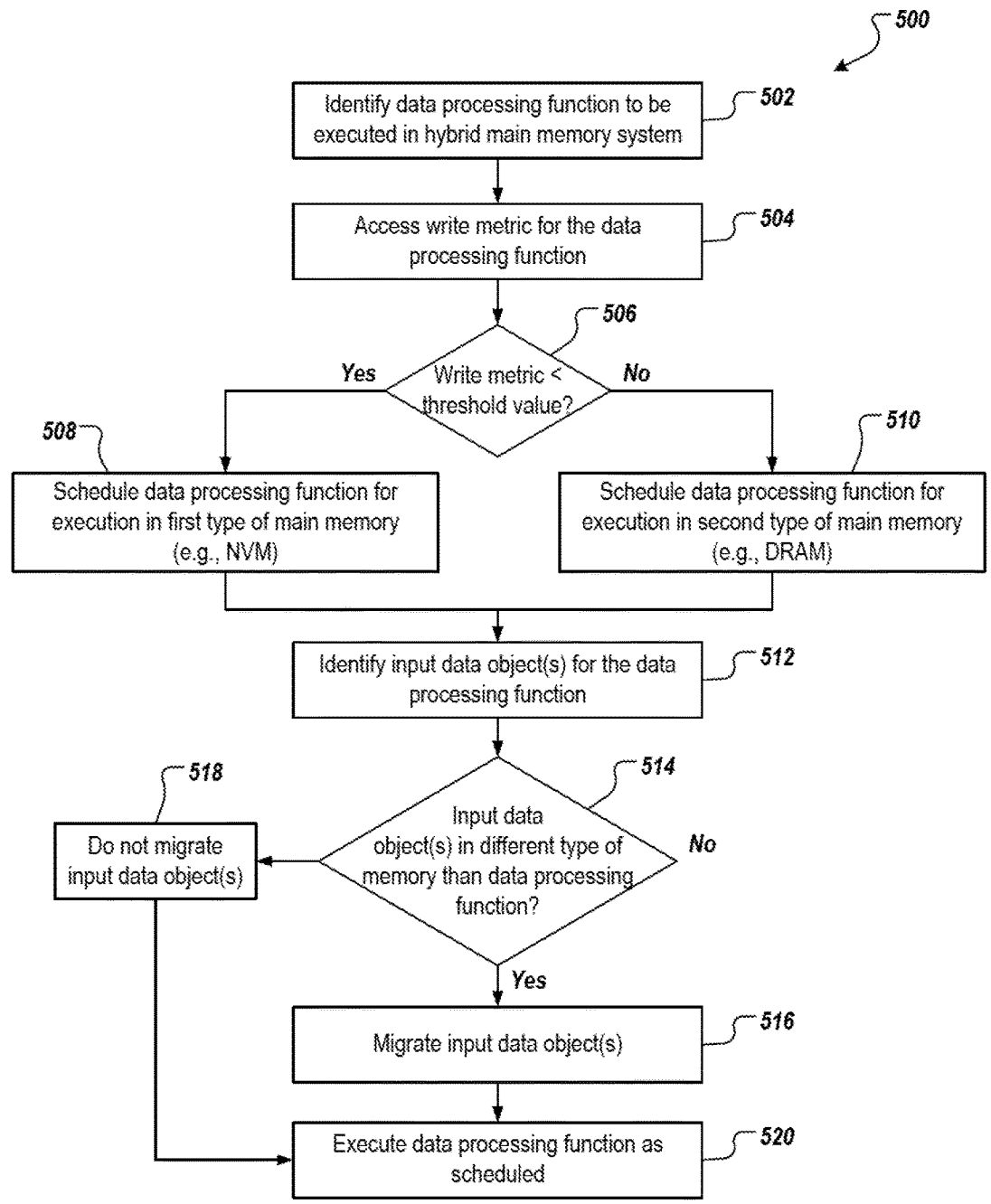
FIG. 5 depicts an example process that can be executed in accordance with implementations such as those of the present disclosure.

FIG. 5 depicts an example process 500 for scheduling data processing functions for execution in a hybrid main memory system 104, in accordance with implementations of the present disclosure. In some implementations, the example process 500 may be performed using one or more computer-executable programs executed using one or more computing devices. For example, operations of the example process 500 may be performed by one or more of the scheduler 214, the optimizer 216, or other program(s).

A data processing function may be identified (502) to be executed in a hybrid main memory system 104. In some examples, as described above, the data processing function may be included in a QEP 204 of an application 202.

A write metric for the data processing function may be accessed (504). The write metric may be included in the function metrics 218 for the data processing function, and may have been previous calculated, as described above with reference to FIG. 4.

It is determined whether the write metric is less than a predetermined threshold value (506). If so, the process may proceed to 508. If not, the process may proceed to 510. Although examples herein may describe traversing a first execution path, if the write metric is less than a threshold value, and traversing a second execution path, if the write metric is at least a threshold value (e.g., greater than or equal to), implementations of the present disclosure are not limited to this particular algorithm for evaluation. In some implementations, the first execution path may be traversed, if the write metric is less than or equal to the threshold value, and the second execution path may be traversed, if the write metric is greater than the threshold value.

The data processing function may be scheduled (508) for execution in a first type of main memory in the hybrid main memory system 104. The data processing function may be scheduled (510) for execution in a second type of main memory in the hybrid main memory system 104. In some implementations, the first type of main memory is NVM and the second type of main memory is DRAM. Implementations of the present disclosure also support the use of other memory types for one or both of the first type or the second type of main memory.

One or more input data objects that are to be consumed as input by the data processing function are identified (512), as described above with reference to FIG. 3.

It is determined whether the input data object(s) are currently in a different type of main memory than the type in which the data processing function is to be executed (514). If so, the process may proceed to 516 and the input data object(s) may be migrated to the type of main memory where the data processing function is to be executed. If it is determined that the input data object(s) are currently present in the type of main memory where the data processing function is to be executed, the process may proceed to 518 and the input data object(s) may not be migrated.

The data processing function may be executed as scheduled (520), in the designated portion (e.g., NVM or DRAM) of the hybrid main memory system 104.

In some examples, as in the example of FIG. 5, the migration of input data object(s) may be performed after the scheduling determination is made (e.g., 506, 508, 510 of FIG. 5), but prior to execution of the data processing function (e.g., 520 of FIG. 5). In some implementations, the data processing function is executed (e.g., immediately) following the determination (e.g., 506 of FIG. 5), and the migration of the input data object(s) may be performed prior to execution of the data processing function.

Various criteria may be employed to determine the threshold value on which to base the decision of where to execute a data processing function. In some examples, the threshold value may be selected based on one or more of the following: a measured or otherwise determined rate of degradation of NVM due to write operations; a measured or otherwise determined difference in write latency between NVM and DRAM; and/or a measured or otherwise determined percentage of execution time require to execute a particular function with respect to the total execution time of the workload.

By calculating the write metric for one or more data processing functions using statistics output from instrumented code, and employing the write metric to determine a portion of main memory on which to execute the data processing function(s), implementations of the present disclosure may be described as using application-specific knowledge for orchestrating data management at the application level rather than relying on the Operating System (OS) to make scheduling decisions. An application may be aware of the characteristics of each allocated object, e.g., when a particular object is to be accessed, the data access pattern, the frequency of memory accesses, the lifetime of data object(s), and so forth. These characteristics may be available at the application level but may not be available to an OS that may lack such detailed information about the application and its allocated objects. Accordingly, based on such knowledge, data placement decisions may be performed in a proactive way rather than a reactive way by the scheduler 214 or other process(es).

Figure 6:
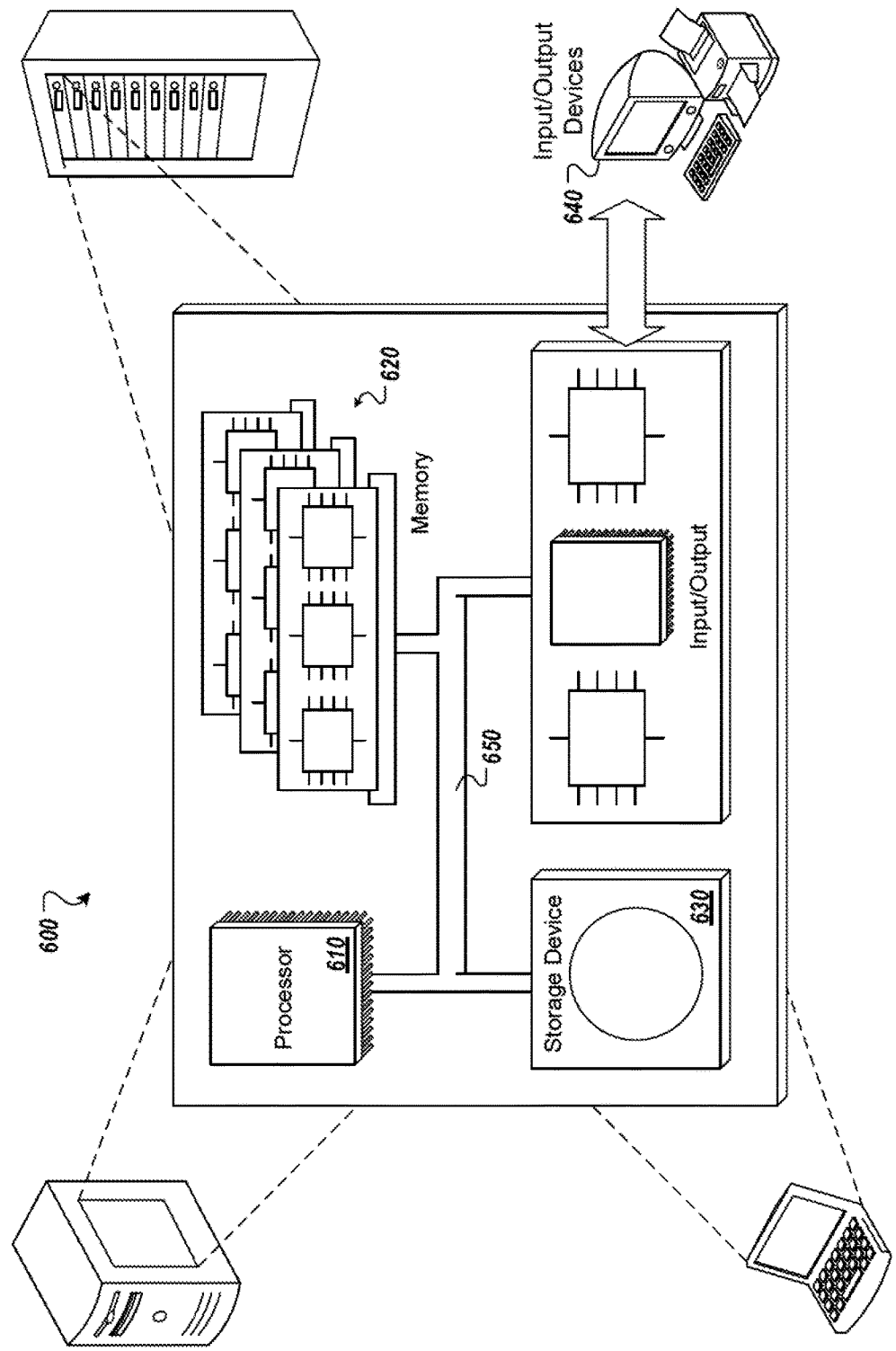
FIG. 6 is a schematic illustration of example computer systems that may be employed for implementations such as those of the present disclosure.

FIG. 6 depicts a schematic diagram of an example computing system 600. The system 600 may be used to perform the operations described with regard to one or more implementations of the present disclosure. For example, the system 600 may be included in any or all of the server components, or other computing device(s), discussed herein. The system 600 may include one or more processors 610, one or more memories 620, one or more storage devices 630, and one or more input/output (I/O) devices 640. The components 610, 620, 630, 640 may be interconnected using a system bus 650.

The processor 610 may be configured to execute instructions within the system 600. The processor 610 may include a single-threaded processor or a multi-threaded processor. The processor 610 may be configured to execute or otherwise process instructions stored in one or both of the memory 620 or the storage device 630. Execution of the instruction(s) may cause graphical information to be displayed or otherwise presented via a user interface on the I/O device 640. The processor(s) 610 may include the CPU 102.

The memory 620 may store information within the system 600. In some implementations, the memory 620 is a computer-readable medium. In some implementations, the memory 620 may include one or more volatile memory units. In some implementations, the memory 620 may include one or more non-volatile memory units. The memory 620 may include the hybrid main memory system 104.

The storage device 630 may be configured to provide mass storage for the system 600. In some implementations, the storage device 630 is a computer-readable medium. The storage device 630 may include a floppy disk device, a hard disk device, an optical disk device, a tape device, or other type of storage device. The I/O device 640 may provide I/O operations for the system 600. In some implementations, the I/O device 640 may include a keyboard, a pointing device, or other devices for data input. In some implementations, the I/O device 640 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method comprising:
 identifying, by the one or more processors, a data processing function to be executed in a hybrid main memory system, the hybrid main memory system including a first type of main memory and a second type of main memory, the data processing function including data access operations to access the hybrid main memory system;

accessing, by the one or more processors, a write metric for the data processing function, the write metric based at least in part on a proportion of the data access operations that are write operations; and based at least in part on the write metric being less than a threshold value, designating, by the one or more processors, the data processing function for execution in the first type of main memory.

2. The method of claim 1, further comprising:
based at least in part on the write metric being greater than the threshold value, designating, by the one or more processors, the data processing function for execution in the second type of main memory.

3. The method of claim 1, wherein:
the first type of main memory includes non-volatile memory (NVM); and
the second type of main memory includes dynamic random access memory (DRAM).

4. The method of claim 1, wherein the first type of main memory includes at least one memristor.

5. The method of claim 1, wherein:
the first type of main memory is characterized by a first write latency of executing one or more of the write operations;
the second type of main memory is characterized by a second write latency of executing the one or more of the write operations; and
the first write latency is greater than the second write latency.

6. The method of claim 1, further comprising:
determining at least one input data object that is consumed by the data processing function;
based on the at least one input data object being in the first type of main memory, and further based on the data processing function being designated for execution in the second type of main memory, migrating the at least one input data object from the first type of main memory to the second type of main memory; and
based on the at least one input data object being in the second type of main memory, and further based on the data processing function being designated for execution in the first type of main memory, migrating the at least one input data object from the second type of main memory to the first type of main memory.

7. The method of claim 1, further comprising:
during a previous execution of the data processing function, collecting statistics indicating:
a number of the data access operations performed by the data processing function; and
a number of the write operations performed by the data processing function; and
determining the write metric based at least in part on the proportion the number of the write operations to the number of the data access operations.

8. A non-transitory computer-readable storage medium coupled to one or more processors and having instructions stored thereon which, when executed by the one or more processors, cause the one or more processors to perform operations comprising:
identifying a data processing function to be executed in a hybrid main memory system, the hybrid main memory system including a first type of main memory and a second type of main memory, the data processing function including data access operations to access the hybrid main memory system;

accessing a write metric for the data processing function, the write metric based at least in part on a proportion of the data access operations that are write operations; and based at least in part on the write metric being less than a threshold value, designating the data processing function for execution in the first type of main memory.

9. The computer-readable storage medium of claim 8, wherein operations further comprise:
based at least in part on the write metric being greater than the threshold value, designating, by the one or more processors, the data processing function for execution in the second type of main memory.

10. The computer-readable storage medium of claim 8, wherein:
the first type of main memory includes non-volatile memory (NVM); and
the second type of main memory includes dynamic random access memory (DRAM).

11. The computer-readable storage medium of claim 8, wherein the first type of main memory includes at least one memristor.

12. The computer-readable storage medium of claim 8, wherein:
the first type of main memory is characterized by a first write latency of executing one or more of the write operations;
the second type of main memory is characterized by a second write latency of executing the one or more of the write operations; and
the first write latency is greater than the second write latency.

13. The computer-readable storage medium of claim 8, wherein operations further comprise:
determining at least one input data object that is consumed by the data processing function;
based on the at least one input data object being in the first type of main memory, and further based on the data processing function being designated for execution in the second type of main memory, migrating the at least one input data object from the first type of main memory to the second type of main memory; and
based on the at least one input data object being in the second type of main memory, and further based on the data processing function being designated for execution in the first type of main memory, migrating the at least one input data object from the second type of main memory to the first type of main memory.

14. The computer-readable storage medium of claim 8, wherein operations further comprise:
during a previous execution of the data processing function, collecting statistics indicating:
a number of the data access operations performed by the data processing function; and
a number of the write operations performed by the data processing function; and
determining the write metric based at least in part on the proportion the number of the write operations to the number of the data access operations.

15. A system, comprising:
a computing device; and
a computer-readable storage device coupled to the computing device and having instructions stored thereon which, when executed by the computing device, cause the computing device to perform operations comprising:

identifying a data processing function to be executed in a hybrid main memory system, the hybrid main memory system including a first type of main memory and a second type of main memory, the data processing function including data access operations to access the hybrid main memory system;

accessing a write metric for the data processing function, the write metric based at least in part on a proportion of the data access operations that are write operations; and based at least in part on the write metric being less than a threshold value, designating the data processing function for execution in the first type of main memory.

16. The system of claim 15, wherein operations further comprise:

based at least in part on the write metric being greater than the threshold value, designating, by the one or more processors, the data processing function for execution in the second type of main memory.

17. The system of claim 15, wherein:

the first type of main memory includes non-volatile memory (NVM); and the second type of main memory includes dynamic random access memory (DRAM).

18. The system of claim 15, wherein the first type of main memory includes at least one memristor.

19. The system of claim 15, wherein:

the first type of main memory is characterized by a first write latency of executing one or more of the write operations;

the second type of main memory is characterized by a second write latency of executing the one or more of the write operations; and the first write latency is greater than the second write latency.

20. The system of claim 15, wherein operations further comprise:

determining at least one input data object that is consumed by the data processing function;

based on the at least one input data object being in the first type of main memory, and further based on the data processing function being designated for execution in the second type of main memory, migrating the at least one input data object from the first type of main memory to the second type of main memory; and based on the at least one input data object being in the second type of main memory, and further based on the data processing function being designated for execution in the first type of main memory, migrating the at least one input data object from the second type of main memory to the first type of main memory.

* * * * *